US011232435B2

(12) United States Patent
Musil et al.

(10) Patent No.: US 11,232,435 B2
(45) Date of Patent: Jan. 25, 2022

(54) SYSTEMS AND METHODS FOR USE IN FACILITATING NETWORK TRANSACTIONS

(71) Applicant: MASTERCARD INTERNATIONAL INCORPORATED, Purchase, NY (US)

(72) Inventors: Aimee G. Musil, O'Fallon, MO (US); Carole Lynne Kelly-Frank, Wildwood, MO (US); Scott J. Page, Wright City, MO (US); John Vignola, Briarcliff Manor, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 624 days.

(21) Appl. No.: 15/610,828

(22) Filed: Jun. 1, 2017

(65) Prior Publication Data
US 2017/0352026 A1 Dec. 7, 2017

Related U.S. Application Data

(60) Provisional application No. 62/344,142, filed on Jun. 1, 2016.

(51) Int. Cl.
*G06Q 20/36* (2012.01)
*G06Q 20/40* (2012.01)
(Continued)

(52) U.S. Cl.
CPC .......... *G06Q 20/367* (2013.01); *G06Q 20/12* (2013.01); *G06Q 20/382* (2013.01); *G06Q 20/40* (2013.01);
(Continued)

(58) Field of Classification Search
CPC ...... G06Q 20/367; G06Q 20/40; G06Q 20/12; G06Q 20/382; G06Q 20/401; G06Q 20/4016
See application file for complete search history.

(56) References Cited

U.S. PATENT DOCUMENTS

2007/0016943 A1* 1/2007 M'Raihi ............... G07C 9/27
726/9
2011/0035794 A1* 2/2011 Wang ................... G07F 7/08
726/9
(Continued)

FOREIGN PATENT DOCUMENTS

CN 104115159 A 10/2014
CN 105580038 A 5/2016
(Continued)

OTHER PUBLICATIONS

Ron White, How Computers Work, 2013, Que, 7th (Year: 2003).*

*Primary Examiner* — Zeshan Qayyum
*Assistant Examiner* — Yingying Zhou
(74) *Attorney, Agent, or Firm* — Harness, Dickey & Pierce, P.L.C.

(57) ABSTRACT

Systems and methods are provided for managing tokens from different token providers and facilitating network transactions involving tokens from the different token providers. One exemplary method includes receiving a request to provision a token for a payment account to a party, where the payment account is associated with a payment network. The method also includes generating the requested token apart from the payment network, whereby the requested token is an external token, and transmitting the external token to the party. The method further includes transmitting, to the payment network, the external token and a PAN for the payment account associated with the external token, thereby permitting the payment network to map the token to the PAN and to provide PAN-dependent services for a transaction based on an authorization request message including the token but not the PAN.

14 Claims, 4 Drawing Sheets

(51) Int. Cl.
*G06Q 20/12* (2012.01)
*G06Q 20/38* (2012.01)

(52) U.S. Cl.
CPC ....... *G06Q 20/401* (2013.01); *G06Q 20/4016* (2013.01)

(56) References Cited

U.S. PATENT DOCUMENTS

| | | | | |
|---|---|---|---|---|
| 2012/0159600 | A1* | 6/2012 | Takagi | G06K 9/036 726/7 |
| 2014/0047233 | A1* | 2/2014 | Kalin | G06Q 20/40 713/155 |
| 2015/0032627 | A1* | 1/2015 | Dill | G06Q 20/385 705/44 |
| 2015/0046338 | A1* | 2/2015 | Laxminarayanan | G06Q 20/38215 705/67 |
| 2015/0112871 | A1* | 4/2015 | Kumnick | G06Q 20/4012 705/67 |
| 2015/0127547 | A1* | 5/2015 | Powell | G06Q 20/385 705/67 |
| 2015/0237041 | A1* | 8/2015 | Flamini | H04L 63/0815 726/10 |
| 2016/0071094 | A1* | 3/2016 | Krishnaiah | G06Q 20/308 705/66 |
| 2016/0148197 | A1 | 5/2016 | Dimmick | |

FOREIGN PATENT DOCUMENTS

| | | |
|---|---|---|
| JP | 2003006444 | 1/2003 |
| JP | 2015535365 | 12/2015 |
| WO | WO2014/047585 | 3/2014 |
| WO | WO2015/013548 | 1/2015 |
| WO | WO2015/054697 | 4/2015 |

* cited by examiner

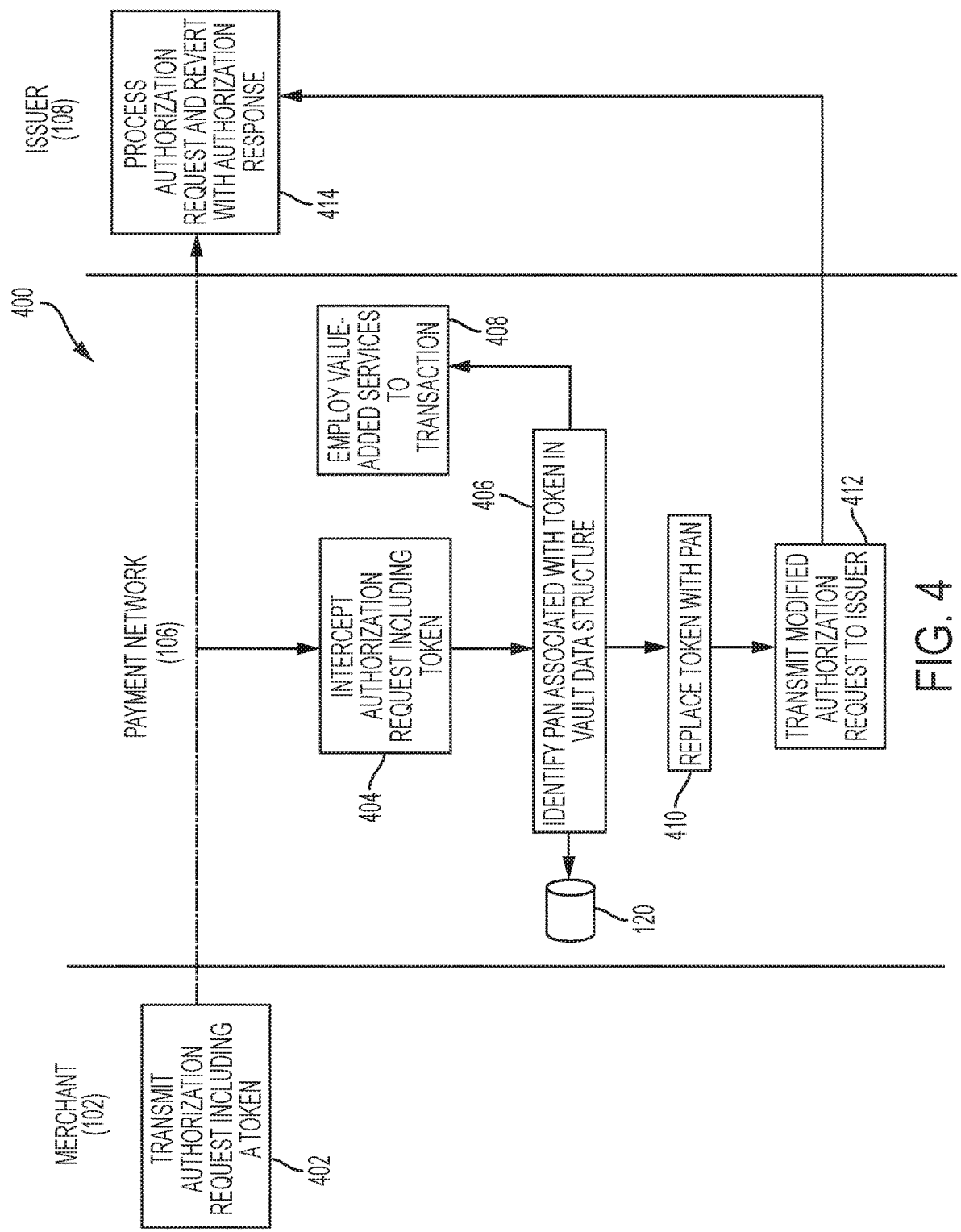

SYSTEMS AND METHODS FOR USE IN FACILITATING NETWORK TRANSACTIONS

CROSS-REFERENCE TO RELATED APPLICATION

This application claims the benefit of, and priority to, U.S. Provisional Application No. 62/344,142 filed on Jun. 1, 2016. The entire disclosure of the above application is incorporated herein by reference.

FIELD

The present disclosure generally relates to systems and methods for use in facilitating network transactions, and in particular, to systems and methods for use in storing tokens representative of payment accounts from multiple token service providers, such that payment networks are permitted to associate tokenized transactions with corresponding ones of the payment accounts.

BACKGROUND

This section provides background information related to the present disclosure which is not necessarily prior art.

Merchants are known to offer various different products (e.g., goods and services, etc.) for sale to consumers. Consumers, in turn, are known to fund purchases of products from the merchants through payment accounts. Often, the payment accounts are used to fund transactions through the presentation of primary account numbers (PANs) associated with the payment accounts to the merchants. In certain instances, tokens associated with the payment accounts are used in lieu of the PANs to enhance security for the transactions. It is also known for payment networks, involved in processing such transactions between the consumers and the merchants, to provide tokens to communication devices or other payment devices, whereby the payment networks, then, are able to map the tokens back to the corresponding payment accounts and/or associated PANs.

DRAWINGS

The drawings described herein are for illustrative purposes only of selected embodiments and not all possible implementations, and are not intended to limit the scope of the present disclosure.

FIG. 4 is an exemplary method that may be implemented in the system of FIG. 1 for use in facilitating network transactions involving tokens from multiple different token providers.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transactions initiated at virtual merchant locations (e.g., at websites, via network-based applications, etc.) or at physical points of sale often involve presentation of payment account information to associated merchants through the virtual or physical locations. The payment account information may be masked or otherwise altered to limit the potential for unauthorized parties to intercept usable payment account information. For example, tokens may be provided to the merchants by the consumers, or requested by the merchants storing card-on-file credentials, in place of primary account numbers (PANs), for transactions involving certain merchants and/or payment devices. Uniquely, the systems and methods herein permit tokens to be generated internal to and external to payment networks involved in processing the transactions, while still preserving the ability of the payment networks to identify payment accounts and/or groups, segments or ranges of payment accounts associated with the tokens. In particular, for example, an integration engine is provided which pulls and/or receives generated tokens from multiple token providers (e.g., token service providers, etc.) and stores the generated tokens in a vault data structure in association with the corresponding payment accounts. Subsequently, upon use of the vault data structure, a payment network is able to identify appropriate payment accounts, individually, or as part of a group, or as part of segments or ranges, based on the tokens used in the underlying transactions, and, in turn, employ various value added services, if any, for those payment accounts and/or transactions.

Figure 1:
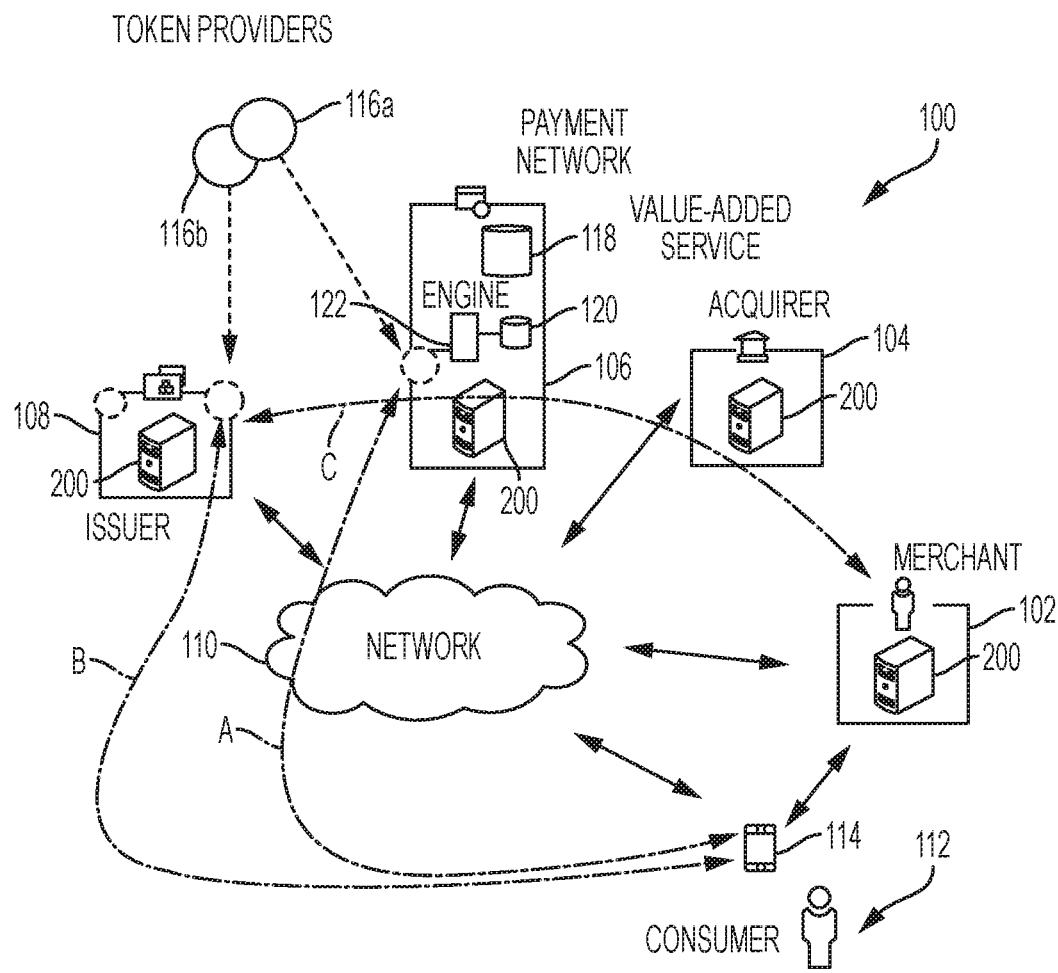
FIG. 1 is a block diagram of an exemplary system of the present disclosure suitable for use in facilitating network transactions involving tokens from multiple different token providers.

FIG. 1 illustrates an exemplary system 100 in which the one or more aspects of the present disclosure may be implemented. Although the system 100 is presented in one arrangement, other embodiments may include systems arranged otherwise depending, for example, on a number of entities involved in issuing tokens (i.e., a number of token providers in the systems), a manner in which value-added services are invoked for transactions, sources of tokenization requests (e.g., merchants, virtual wallets, etc.), etc.

In the illustrated embodiment, the system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchant 102, the payment network 106, the issuer 108, and one or more various consumers in the system 100 (e.g., consumer 112, etc.), etc.

The merchant 102 in the system 100 is generally associated with products (e.g., goods and/or services, etc.) for purchase by one or more consumers (including consumer 112). The merchant 102 may offer the products for sale through a physical storefront and/or a virtual storefront, etc., for example, to the consumer 112. In this exemplary embodiment, the consumer 112 is associated with a payment account, which is issued by issuer 108 and suitable for use in funding transactions for products at the merchant 102 (or at other merchants as desired).

The consumer 112 is associated with a communication device 114, which includes a payment application (not shown). Example payment applications may include, for example, Masterpass™ from MasterCard®, Apple Pay® from Apple®, PayWave® from Visa®, etc., or other virtual wallet-type applications offered by the merchant 102, the payment network 106, the issuer 108, or other entities. The payment application, when active, permits the communication device 114 to behave as a payment device.

Specifically in the system 100, the payment application at the consumer's communication device 114 is provisioned with a token, which is associated with a payment account. A token (e.g., a payment token, etc.), generally, is an electronic data set including credentials that may be used in a purchase transaction in place of traditional payment credentials and is uniquely associated to a domain, such as, for example, a computing device (e.g., the communication device 114, etc.), a merchant (e.g., the merchant 102, etc.), etc. In connection therewith, the token is generally sufficient to be employed in the payment application, for example, as included at the communication device 114 (e.g., including the token, token card data (e.g., expiration data, verification code, etc.) and token EMV keys, etc.), etc. Because the token is directly associated to a domain (e.g., a computing device such as communication device 114, etc.), theft of the token may be inconsequential to the consumer 112, since the token is unusable if not used in conjunction with the proper domain. Thus, in the illustrated embodiment, the use of the token can enable electronic payment transactions involving the communication device 114 with greater security and without a sacrifice to efficiency or convenience.

Apart from the communication device 114, in this exemplary embodiment, the consumer 112 maintains a "card-on-file" with the merchant 102 or otherwise permits the merchant 102 to know, access, and/or hold payment account information (e.g., a token, etc.), which is used, by the merchant 102, to fund payment transactions and/or recurring payment transactions by the consumer 112 for products at the merchant 102. Similar to the above, the merchant 102 does not maintain the PAN for the consumer's payment account, but instead in this example stores a token associated therewith. What's more, the merchant 102 may request a token for limited use for funding transactions with the consumer 112, or may request a token for use in future use as a "card-on-file" token (i.e., as a first time request for "card-on-file" transactions), etc. Likewise, rather than the merchant 102, a virtual wallet provider (not shown) may request a token for limited use for funding transactions of the consumer 112, or may request a token for use in future transactions as a "card-on-file" token, etc. It should be appreciated that tokens generated in response to requests for tokens in any manner, and provisioned to any different type of device, merchant (or other entity), application, etc. are within the scope of the present disclosure, and the description herein is not limited to any particular token or manner in which the token is to be used by consumers, merchants, applications, etc.

With continued reference to FIG. 1, the system 100 also includes two token service providers 116a-b. Each of the token providers 116a-b is illustrated as separate from the payment network 106 and the issuer 108 (and other parts of the system 100) (e.g., as third party service providers, etc.), but, as indicated by the dotted lines, may be incorporated (physically or by control/agreement, etc.) into the payment network 106 and/or the issuer 108. For purposes of the description herein, in this exemplary embodiment, token provider 116a is incorporated with (or forms part of) the payment network 106, and token provider 116b is incorporated with (or forms part of) the issuer 108. In this manner, for example, the token provider 116b provides token services for payment accounts (or ones of the payment accounts) issued by the issuer 108. However, it should be appreciated that one or both of the token providers 116a-b (or other token providers) may be separate, stand-alone parts of the system 100 in other embodiments (broadly, third-party token service providers, etc.). Moreover, it should be appreciated that a different number of token providers may be included in the system 100, and that a different number of payment networks and/or issuers may be included, into which one or both of the token providers 116a-b (or other token providers) is/are incorporated, or not.

As indicated above, upon initiation of the payment application in the consumer's communication device 114 in the system 100, the payment application requests, via the communication device 114, to be provisioned a token associated with the consumer's payment account, so that it may be employed to facilitate payment account transactions using the communication device 114.

The token request, by the communication device 114 and/or payment application, may be directed to either of the token providers 116a-b. If the payment account application (or the merchant 102 or virtual wallet provider, etc.) is linked to the token provider 116a, for example, the payment application is configured to provide the request to the token provider 116a, at the payment network 106, to be provisioned a token, consistent with path A in FIG. 1. In response, the token provider 116a is configured to identify the consumer's payment account for which the token is to be generated. Specifically, for example, the token provider 116a generates the token and provisions the token to the payment application (and the communication device 114 (or the merchant 102 or the virtual wallet for "card-on-file" scenarios, etc.)). Often, in various embodiments, the token is generated, by the token provider 116a, consistent with one or more standards, including for example, the EMV Payment Tokenization Specification, Technical Framework, etc. In generating the token, the token provider 116a, for example, may assign a transactable account number of similar characteristics to that of the PAN for the payment account. Other payment credentials may further be generated and associated with the token, as required for interoperability at a physical point of sale (POS) location or virtual location, and may be loaded to a device (e.g., the communication device 114, etc.) in addition to the token. Further, as part of the token generation and provisioning process, the token service provider (including token providers 116a-b) may apply a designated identification and verification (ID&V) assurance method to ensure a trusted association of the token to the PAN. In connection therewith, the token provider 116a is configured to associate the token with the consumer's payment account, and specifically, with the PAN for the payment account.

Conversely, if the payment account application is linked to the token provider 116b, the request to provision the communication device 114 with the token is directed to the token provider 116b, at the issuer 108, consistent with path B in FIG. 1. As described with reference to the token provider 116a, in response to the request, the token provider 116b is configured to generate the token and associate it with the consumer's payment account, and specifically, with the PAN for the payment account. Here, the token provider 116b may further be configured to abide by rules (when generating tokens) related to form, content and/or range of the token, which may be defined by the payment network 106, for example.

It should also be appreciated that more than one token may be generated for the consumer's payment account by one or both of the token providers 116a-b. For example, one token may be provisioned in a virtual wallet application of the communication device 114 in which the payment account is included, while another token may be provisioned to a wearable device associated with the payment account (e.g., an Apple® watch, etc.). It should further be appreciated that tokens described herein may be provisioned to any device and/or to one or more entities, such as, for example, the merchant 102, etc., which use to the token (with the permission of the consumer 112) to initiate and/or facilitate transactions to the consumer's payment account.

Once provisioned with a token, at the request of the payment application, the communication device 114 (or other device) may be used to facilitate a payment account transaction to the consumer's payment account. Specifically, in an exemplary transaction in the system 100 between the consumer 112 and the merchant 102, for example, the consumer 112 may present the communication device 114 to the merchant 102 in connection with purchasing a product (e.g., to a point-of-sale (POS) terminal associated with the merchant 102, etc.). The merchant 102, in response, generates an authorization request for the transaction to be funded by the consumer's payment account and communicates the authorization request (e.g., including the payment account token associated with the account, an amount of the purchase, a cryptogram associated with enhanced authentication operations, etc.) to the acquirer 104. The authorization request is transmitted along path C in the system 100. In turn, the acquirer 104 communicates the authorization request with the issuer 108 along path C, generally through the payment network 106, such as, for example, through MasterCard®, VISA®, Discover®, American Express®, etc. In connection therewith, in various embodiments, the payment network 106 may append the PAN to the authorization request (particularly where the token is issued by the payment network 106) so that the issuer 108 is able to identify the consumer's payment account (however, this may not be required where the token is associated with the issuer 108). In any case, upon receipt, the issuer 108 determines if the consumer's payment account is in good standing and if there is sufficient funds and/or credit to cover the transaction. If approved, an authorization reply (indicating the approval of the transaction) is transmitted by the issuer 108 back to the merchant 102, again along path C, thereby permitting the merchant 102 to complete the transaction. And, again in various embodiments, the payment network 106 may append the token to the authorization reply (and remove the PAN therefrom, if the PAN was previously appended to the authorization request) so that the merchant 102 is again unaware of the consumer's PAN (thereby maintaining a security feature associated with using the token in the transaction with the merchant 102 instead of the PAN).

The transaction is later cleared and/or settled by and between the merchant 102, the acquirer 104, and the issuer 108. If the transaction is declined, however, an authorization reply (indicating a decline of the transaction) is provided by the issuer 108 back to the merchant 102, thereby permitting the merchant 102 to halt or terminate the transaction or request an alternative form of payment.

Transaction data is generated, collected, and stored as part of the above exemplary interactions among the merchant 102, the acquirer 104, the payment network 106, the issuer 108, and the consumer 112. The transaction data includes a plurality of transaction records, one for each transaction, or attempted transaction. The transaction records, in this exemplary embodiment, are stored at least by the payment network 106 (e.g., in a data structure associated with the payment network 106, etc.), but could be stored in other parts of the system 100 and transmitted as needed or requested. As used herein, transaction data may include, for example (and without limitation), tokens and related token information, PANs, amounts of the transactions, merchant IDs for merchants involved in the transactions, merchant category codes (MCCs), balances, payment history dates/times of the transactions/payments, incentives used (e.g., rebates discounts, etc.), etc. It should be appreciated that more or less information related to transactions, as part of either authorization or clearing and/or settling, may be included in transaction records and stored within the system 100, at the merchant 102, the acquirer 104, the payment network 106 and/or the issuer 108.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions herein, subsequently for one or more of the different purposes described herein.

As further shown in FIG. 1, the payment network 106 includes value-added services 118, which may rely on transaction data for transactions performed by the consumer 112 and/or with the consumer's permission, as identified above. As used herein, the value-added services 118 may include any services offered by the payment network 106 in addition to the basic data management associated with payment account transactions (i.e., the routing authorization messages, settling, and clearing). With that in mind, the value-added services 118 may include, without limitation, risk monitoring services, payment account reference services, consumer control services, fraud services, validation of the incoming cryptograms, authentication services, reward and/or loyalty services, marketing services, reporting and/or notification services, analytics services, token services, etc. In the above transaction between the consumer 112 and the merchant 102, then, it should be appreciated that when the authorization request, as generated by the merchant 102, is received at the payment network 106, the payment network 106 may identify the PAN associated with the token included in the authorization request and, in turn, employ a variety of value-added services 118 to the transaction, as associated with the consumer's payment account based on the identified PAN. In addition, the payment network 106 may also append the PAN to the authorization request so that the issuer 108 is able to identify the consumer's payment account (for example, where the token is provisioned by the token provider 116a and potentially unknown to the issuer 108, etc.).

While one merchant 102, one acquirer 104, one payment network 106, one issuer 108, one consumer 112, one communication device 114, and two token providers 116a-b are included in the system 100 illustrated in FIG. 1, it should be appreciated that any number of these entities/devices (and their associated components) may be included in the system 100, or may be included as a part of systems in other embodiments, consistent with the present disclosure.

Figure 2:
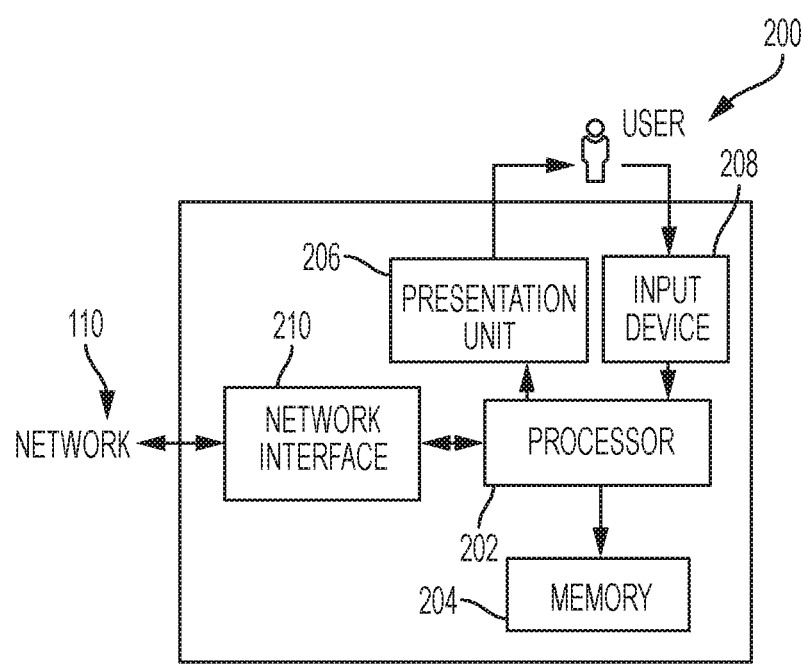
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein.

In particular, in the exemplary system 100 of FIG. 1, each of the merchant 102, the acquirer 104, the payment network 106, and the issuer 108 are illustrated as including, or being implemented in, computing device 200, coupled to the network 110. In addition, the consumer's communication device 114 may be considered a computing device consistent with computing device 200. Further, the token providers 116a-b and the value-added services 118 can each be considered a computing device (or as including a computing device or as being implemented in a computing device) consistent with computing device 200 for purposes of the description herein. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, tokens and related token information (as part of the transaction data or separate therefrom), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., product information, purchase information, transaction data, token information, etc.), either visually or audibly to a user of the computing device 200, for example, the consumer 112 in the system 100, users associated with other parts of the system 100, etc. Various interfaces (e.g., as defined by network-based applications, webpages, short message service (SMS) messages, emails, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, purchase selections, service selections, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to/with one or more different networks, including the network 110. Further, in some exemplary embodiments, the computing device 200 may include the processor 202 and one or more network interfaces (including the network interface 210) incorporated into or with the processor 202.

Referring again to FIG. 1, the payment network 106 of the system 100 further includes a vault data structure 120 and an integration engine 122. The integration engine 122 is coupled to the vault data structure 120, and is specifically configured, by executable instructions, to perform one or more of the operations herein. In connection therewith, the vault data structure 120 and the integration engine 122 may each be considered a computing device, consistent with computing device 200. While the vault data structure 120 and the integration engine 122 are illustrated as separate parts of the payment network 106, one or both may be incorporated into one or more other computing devices included in the payment network 106 (e.g., into computing device 200, etc.). In addition, while the vault data structure 120 is illustrated as separate from the integration engine 122, in other embodiments the vault data structure 120 may be included in, or associated with, the integration engine 122, for example, in memory 204, etc.

The vault data structure 120 includes a mapping between tokens and PANs for payment accounts, and additional information related to the tokens and/or the PANs, as needed. As described above, the payment network 106 may employ one or more value-added services 118, which are dependent on the PAN associated with a payment account. As such, the payment network 106, upon receipt of an authorization request for a transaction by a consumer (e.g., by consumer 112, etc.), accesses the vault data structure 120 to identify a PAN for a payment account used in the transaction, based on a token included in the authorization request. It should be appreciated that any desired data associated with the token and/or usable by the payment network 106 as invoking the value added services 118, and/or any other operations to be performed by the payment network 106 for a transaction based on the token (or associated PAN), may be included as additional information in the vault data structure 120 for instruction to the payment network 106.

In the example above, when the token for the consumer's payment account is generated by the token provider 116*a* through the payment network 106, it is generally incorporated into the payment network 106 (as indicated by path A). In turn, the payment network 106 (via the integration engine 122 or otherwise) is configured to store the token and the associated PAN for the consumer's payment account in the vault data structure 120. More generally, because the payment network 106 generates the token for the consumer's payment account (through the token provider 116*a*), the payment network 106 (e.g., the integration engine 122, etc.) is able to manage the mapping between the token and the PAN, as defined in the vault data structure 120. Conversely in the example above, when the token is generated by the token provider 116*b* through the issuer 108 (as indicated by path B) (or by some other token provider apart from, or not affiliated with or associated with, the payment network 106), the token provider 116*b* is aware of a range of tokens assigned to the issuer 108. As such, the token provider 116*b* generates a token (within the range for the issuer 108). Notwithstanding the token being within the range associated with the issuer 108, the token is initially unmapped to a PAN in the vault data structure 120 as it is generally unknown to the payment network 106 and/or the integration engine 122 (except as to which issuer range it belongs, for example, the issuer 108).

Uniquely in the system 100, the integration engine 122 is also configured to facilitate storage of the token generated for the consumer's payment account by the token provider 116*b*, and the associated PAN, in the vault data structure 120. In particular in the system 100, when the token provider 116*b* generates the token, as described above, it is also configured to transmit the token to the integration engine 122 (upon generation, or at one or more regular or irregular intervals along with other generated tokens, etc.). In connection therewith, in one or more examples, the integration engine 122 is configured to expose an application programming interface (API), which is invoked, by the token provider 116*b*, as part of the token generation to automate the transmission of the generated token (and associated PAN) to the integration engine 122. Alternatively, or additionally, the token provider 116*b* may cause the token and associated PAN to be transmitted to the integration engine 122 in any number of other manners (via an API or otherwise). In addition, in some embodiments the token provider 116*b* is configured to transmit the token to the integration engine 122 in real time or near real time. Further, in at least one embodiment, the integration engine 122 is configured to retrieve or otherwise pull token information, for example, in the form of a bulk file (or otherwise), from the token provider 116*b* according to one or more regular or irregular intervals.

Regardless of the manner in which the token is received or retrieved from the token provider 116*b*, the integration engine 122 is configured to store the token in the vault data structure 120 as described above. For example, the integration engine 122 is configured to generally store the token in the vault data structure 120 in association with information related to the token, such as a map of the token to the PAN and/or a map of the token to the consumer's payment account. In addition, the integration engine 122 may also be configured to include further information in the vault data structure 120, in association with the token, such as information related to the consumer 112, the issuer 108, and any associated value-added services 118 associated with the payment account; information identifying a token requestor ID (e.g., an ID associated with the payment application at the consumer's communication device 114, etc.); information indicating, without limitation, a token assurance level or method, information identifying the funding PAN (or FPAN, which is the PAN); token status (e.g., active, suspended, deleted, etc.); etc.

Subsequently, as described above, when the payment network 106 receives an authorization request for a transaction by the consumer 112, for example, including a token generated by the token provider 116*b*, or other token provider (shown or not shown), the payment network 106, via the integration engine 122, is able to map the token to the PAN for the payment account, via the vault data structure 120, and employ, if necessary or desired or appropriate, one or more of the value-added services 118 in connection with the transaction. In one example, the value-added services 118 may include, without limitation, a validation of an incoming cryptogram associated with the token assigned by the token provider (e.g., one of token providers 116*a*-*b*, etc.). The cryptogram is able to be carried in different fields in the transaction authorization message based on, for example, the type of transaction and associated use case. In particular, for example, NFC contactless transactions may carry the token cryptogram in existing chip data fields, while other transactions may contain token cryptograms in existing track data fields or other existing data fields of authorization messages, etc.

Figure 3:
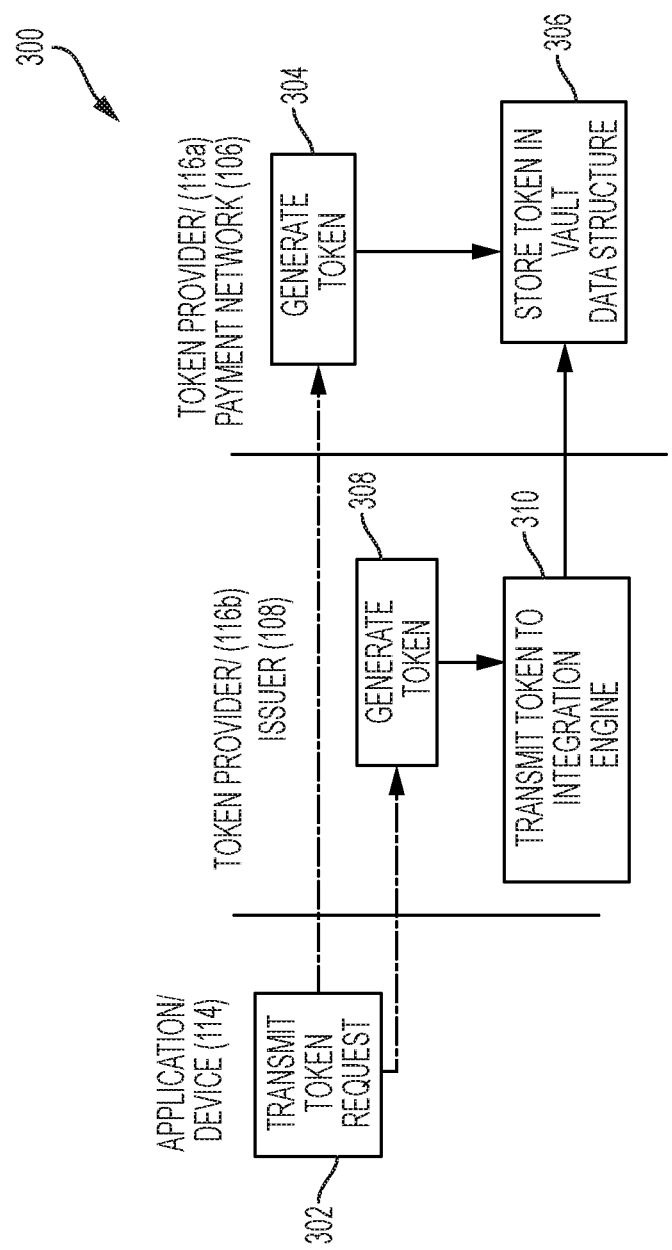
FIG. 3 is an exemplary method that may be implemented in the system of FIG. 1 for use in managing a vault data structure comprising multiple tokens from different token providers.

FIG. 3 illustrates an exemplary method 300 for use in managing a vault data structure comprising multiple tokens from different token providers. The exemplary method 300 is described as implemented in the payment network 106 (and the integration engine 122 thereof), and more generally in the system 100, and further with reference to computing device 200. However, it should be understood that the method 300 is not limited to this configuration of the integration engine 122 or the system 100, as the method 300 may be implemented, at least in part, in other parts in system 100, or in multiple other computing devices or systems. As such, the methods herein should not be understood to be limited to the exemplary system 100 or the exemplary computing device 200, and likewise, the systems and the computing devices herein should not be understood to be limited to the exemplary method 300.

At the outset in the method 300, the consumer 112 attempts to enable the communication device 114 as a payment device, for example, for use in initiating purchase transactions at merchants to the consumer's payment account (e.g., at the merchant 102, etc.). In doing so, the payment application generates and transmits a request, at 302, for a token for the consumer's payment account, i.e., a request for the communication device 114 to be provisioned with a token associated with the consumer's payment account. The request, as indicated by the dotted lines in FIG. 3, is directed to either the token provider 116*a* (associated with the payment network 106) or the token provider 116*b* (associated with the issuer 108) (or another token provider (not shown)), depending on with whom the payment application is managed (i.e., the payment network 106 or the issuer 108) and/or the retained token service provider for that manager.

If the token request for the consumer's payment account is received at the token provider 116a (as incorporated in the payment network 106), the token provider 116a generates the token, at 304. Here, the generated token is broadly referred to as an internal token, and is generated consistent with a range of tokens available and/or assigned by the payment network 106 to the issuer 108 for associating with payment accounts issued by the issuer 108. As described above in the system 100, it should again be appreciated that a variety of different techniques may be used to generate the token, any of which may be employed herein (e.g., a technique consistent with the EMV Payment Tokenization Specification, Technical Framework, etc.). In turn, the token provider 116a transmits the token back to the payment application, thereby provisioning the payment application (and communication device 114) with the token and enabling the communication device 114 as the payment device. In addition, the token is provided to the integration engine 122, as part of the payment network 106, which, in turn, stores the token in the vault data structure 120, at 306 (as described above).

Conversely, if the token request for the consumer's payment account is received at the token provider 116b (apart from the payment network 106), the token provider 116b generates the token, at 308. Here, the token is broadly referred to as an external token (as it is generated apart from, and not associated with or affiliated with, the payment network 106), and is again generated consistent with a range of tokens available and/or assigned by the payment network 106 to the issuer 108, and provided to the token provider 116b.

In addition, it should also be appreciated that the value-added services 118 provided by the payment network 106 may rely on additional information, etc., which may be provided from outside the payment network 106. In particular, in one or more embodiments, the token provider 116b and/or the issuer 108 may generate such additional information, etc. As an example, when one of the value-added services 118 provided by the payment network 106 relates to cryptography (e.g., in the context of EMV transactions, etc.), the token provider 116b and/or the issuer 108 may generate cryptographic keys (as the additional information) suitable for use by the payment network 106, as described below. This may be done in connection with generating the token, at 308, or apart therefrom.

Then in the method 300, once the token (and the other information (e.g., the cryptographic keys, etc.), etc.) is (are) generated, the token provider 116b (and/or the issuer 108) transmits the token (and the other/additional information) to the integration engine 122 at the payment network 106, at 310. For instance, in the above example where one of the value-added services 118 provided by the payment network 106 relates to cryptography, the token provider 116b (and/or the issuer 108) may also provide the cryptographic keys (as the other/additional information) to the payment network 106, at 310, for use by the payment network 106 as described below.

In this exemplary embodiment, the token provider 116b transmits the token (or multiple tokens) to the payment network 106 in real time, or near real time following generation and/or provisioning of the token. Real-time, for example, may include transmitting (e.g., by the token provider 116b, etc.) and/or receiving (e.g., by the payment network 106, etc.) the token immediately after or within a few seconds of the token being generated (e.g., within about one second, within about three seconds, within about five seconds, within about ten seconds, within about thirty seconds, within about one minute, etc.), and near real-time may include transmitting and/or receiving the token within a later time of the token being generated, but still within about a minute, about two minutes, about five minutes, or about 30 minutes, etc.

The timing of transmitting the token may be specific to certain tokens and/or may depend on one or more rules related to provisioning, fraud prevention, etc. In various embodiments, the token provider 116b may further transmit the token (and other tokens) to the payment network 106 at one or more regular or irregular intervals (e.g., every one minute, every five minutes, every one hour, or every day, etc.). In addition, in some embodiments, timing of the transmission of the token from the token provider 116b to the payment network 106 may be determined by the issuer 108 based on an anticipated use of the token. Specifically, for example, when the consumer 112 provisions the communication device 114 with the token, it may be associated with use of the communication device 114 as a payment device. As such, prompt transmission of the token to the payment network 106 may be dictated by the issuer 108, to ensure that the payment network 106 is able to intercept tokenized transactions initiated by the communication device 114 within a few minutes, or more or less, of the token being generated and transmitted/provisioned to the communication device 114.

In some embodiments, the token provider 116b may transmit the token to the payment network 106 as part of a bulk/batch file (with other generated tokens for this and/or other payment accounts), or potentially as an individual transmission to the integration engine 122 that is specific to the token (with each token, once generated by the token provider 116b, then transmitted to the payment network 106 separately). In general, when the token is included as part of a batch file when the token is generated and/or provisioned, the token provider 116b conforms the batch file to a format defined by the integration engine 122 and/or the payment network 106, which may aid in storing the batch file (and the token(s) therein) to the vault data structure 120. In one or more other embodiments, the token is transmitted, alone or with one or more other tokens, via an ISO 8583-based network message (e.g., the Issuer File Maintenance Request/0302 message, etc.), an ISO 2022 message, an API, etc. Further, in at least one embodiment, the token provider 116b, as part of generating the token, or in addition thereto, invokes an API associated with the integration engine 122, which then facilitates the transmission of the token (and associated token information) to the integration engine 122 and payment network 106.

Then in the method 300, upon receipt of the token from the token provider 116b, the integration engine 122 stores, at 306, the token in the vault data structure 120, as described above, for use by the payment network 106. Tokens received from token provider 116b and/or other external token providers (i.e., token providers separate from the payment network 106), as compared to internal tokens received from token provider 116a, may be segregated into a segment of the vault data structure 120. Then, the vault data structure 120 may further associate an indicator with the external tokens from the token provider 116b (or other external token provider) from which the tokens were received, to distinguish them from the internal tokens from the token provider 116a. In general, for each token, the integration engine 122 stores, in the vault data structure 120, without limitation, a token assurance level or method, information identifying a FPAN, the indicator associated with the token (e.g., internal token indicator, external token indicator, etc.), token status (e.g., active, suspended, deleted, etc.), etc.

It should be appreciated that, in addition to generating tokens and transmitting them for storage in the vault data structure 120, as described above, the token providers 116a-b may interact with the integration engine 122 to update and/or delete tokens (and associated token information) in the vault data structure 120. For example, if the communication device 114 were stolen or otherwise compromised, the consumer 112, or the issuer 108 associated with the consumer's payment account included in the payment application at the communication device 114, may request the token provisioned to the communication device 114 be suspended or deleted from the vault data structure 120. As can be appreciated, various motivations may be provided to update and/or delete tokens at the vault data structure 120, which may be coordinated through the integration engine 122. In general, however, the integration engine 122, based on a request to update, suspend and/or delete a token, will retain the token in the vault data structure for a period of time (e.g., 90 days, 120 days, etc.), to inhibit potential interference (or other issues) with settling and clearing prior transactions associated with the tokens. Conversely, when fraud is indicated as a reason for updating and/or deleting a token, the integration engine 124 may impose a relatively short time period, or act immediately to update or suspend or delete the token in the vault data structure 120. Further, the integration engine 122 may act to delete a token from the vault data structure 120 based on expiration data provided by the token providers 116a-b associated with the particular token.

While method 300 is described herein with reference to provisioning a token to the communication device 114, it should be appreciated that other attempts to request a token are within the scope of the method 300. Specifically, for example, the token providers 116a-b may respond substantially consistently when the merchant 102, or a network-based application requests a token for use in transactions between the consumer 112 and the merchant 102, or in connection with network-based applications and/or accounts (e.g., for in-app payments, etc.).

In view of the above, it can be seen that, in connection with managing the vault data structure 120 by the integration engine 122, comprising tokens from both the internal token provider 116a and the external token provider 116b, that the token information generated at the external token provider 116b and/or the issuer 108 is generally mirrored to the vault data structure 120 of the payment network 106, for seamless use by the payment network 106 as described herein.

FIG. 4 illustrates an exemplary method 400 for processing transactions to payment accounts involving tokens from different token providers. The exemplary method 400 is again described as implemented in the payment network 106, and more generally in the system 100, and further with reference to computing device 200. However, it should be understood that the method 400 is not limited to this configuration of the payment network 106 or the system 100, as the method 400 may be implemented, at least in part, in other parts of the system 100, or in multiple other computing devices or systems As such, the methods herein should not be understood to be limited to the exemplary system 100 or the exemplary computing device 200, and likewise, the systems and the computing devices herein should not be understood to be limited to the exemplary method 400.

As described above in the system 100 and the method 300, when the token is generated for the consumer's payment account, it may be provisioned to the consumer's communication device 114 for use in initiating purchase transactions involving the consumer's payment account. The token may include a token generated by the token provider 116a through the payment network 106 (e.g., an internal token, etc.), or it may include a token generated by the token provider 116b through the issuer 108 (e.g., an external token, etc.).

In the method 400, when the token is used in a transaction by the consumer 112 at the merchant 102 (via the communication device 114), an authorization request for the transaction is generated by the merchant 102 and transmitted, at 402, from the merchant 102 (or another entity participating in the transaction) to the issuer 108 of the consumer's payment account (e.g., along path C in FIG. 1, etc.). In connection therewith, the payment network 106 intercepts the authorization request, at 404, and identifies the token therein. The payment network 106 (via the integration engine 122) next identifies the payment account associated with the token and, in particular in the method 400, identifies the PAN associated with the token in the vault data structure 120, at 406. Because the token, when generated herein (regardless of by the token provider 116a or the token provider 116b), is transmitted and stored in the vault data structure 120 (see, method 300), the payment network 106 (e.g., via the integration engine 122) is able to readily identify the payment account, and PAN, based on the retrieved token. Then, upon identification of the PAN, the payment network 106 employs, at 408, the appropriate value-added service or services 118 to the transaction, as associated with the identified PAN, the identified payment account (or corresponding segments, groups, or programs to which the payment account belongs), the issuer 108, the consumer 112, etc. (based on additional token information included in the vault data structure 120 in association with the token). In particular, for example, when one of the value-added services 118 relates to enhanced authentication (e.g., based on cryptography, etc.), the payment network 106 may validate, at 408 (as part of employing the value added services 118), a cryptogram included in the authorization request for the transaction (e.g., the ARQC cryptogram in the context of EMV transactions, etc.) based on the cryptographic keys received from the token provider 116b and/or the issuer 108 (e.g., as received in connection with operation 310 in the method 300, etc.). Once validated, in this example application, the payment network 106 provides a cryptogram in response to the transaction (e.g., the ARPC cryptogram in the context of the EMV transactions, etc.) back to the merchant 102, for example. With that said, in some embodiments the payment network 106 may additionally (or alternatively) append the cryptogram (e.g., the ARPC cryptogram in the context of the EMV transactions, etc.) to the authorization request, and then transmit the authorization request to the issuer 108. In still other embodiments, the payment network 106 may additionally (or alternatively) forward the cryptogram originally included in the authorization request (e.g., the ARQC cryptogram in the context of the EMV transactions, etc.) to the issuer 108. In connection therewith, in some implementations, the issuer 108 may then provide a cryptogram in response thereto (e.g., the ARPC cryptogram in the context of the EMV transactions, etc.).

Further, while reference is made to use of the PAN to identify the payment account in the above description, it should be appreciated that a payment account reference number or other identifier of the payment account (or transaction) may be used in place of the PAN for one or more operations described herein, whereby the token is mapped to the reference number or other identifier at the vault data structure 120, and that identifier is then returned to the issuer 108 and/or acquirer 104 in connection with one or more transactions (or used to identify value added services 118).

In another example, in connection with employing the appropriate value-added service or services 118 (at 408), the payment network 106 may implement account controls specific to the payment account. Specifically, for example, the consumer 112 may set specific spend rules for the payment account, such as a $500 daily spend limit, transactions limited to particular white listed merchants, a $100 maximum transaction amount, etc. Because the payment network 106 is able to identify the payment account from the token (even when generated by the external token provider 116b), the payment network 106 is able to implement the controls and decline transactions when not conforming to the rules. Further, in still another example, in connection with employing ones of the value added services 118 (at 408), the payment network 106 may employ one or more fraud protection services, based on the payment account, to evaluate the transaction as being suspicious and/or fraudulent, whereby interaction may be necessary and/or desired. In further examples, in connection with employing ones of the value added services 118 (at 408), the payment network 106 may employ services related to rewards, whereby awards are directed to the consumer 112 (or a reward account associated with the consumer or directly to the consumer's payment account) based on the transaction and other transactions to the payment account. It should be appreciated that any other payment account specific, PAN specific, PAN range specific, etc., services (i.e., as value-added services) may be employed for the transactions, at 408 in the method 400.

In addition to the above, upon intercepting the authorization request for the transaction (at 404) and identifying the PAN associated with the token (at 406), the payment network 106 may append further data to the authorization request, or a corresponding authorization response, based on the outcome of one or more of the employed value added services 118. For example, for fraud services, a risk score may be appended to the authorization request, upon which the issuer 108 may rely, to determine whether to approve or decline the transaction. As such, the issuer 108 is able to utilize, and/or is aware that, additional data, based on the value-added services 118 provided by the payment network 106, may be appended to the authorization message/request, even when the underlying transaction involves an external token (which, traditionally when present, would not allow the payment network 106 to employ the value-added services 118 to the underlying transaction because the payment network 106 would not be able to identifying the involved payment account from the external token). The payment network 106 further logs the PAN for the token with the value-added service or services 118 performed therefore.

With continued reference to FIG. 4, when the token provisioned to the consumer's communication device 114 (and used in the above transaction) is generated by the token provider 116a, the specific token is often unknown to the issuer 108. As such, in this case in the method 400 (and potentially in other cases where the token is generated by other token providers, other than token provider 116b, and is unknown to the issuer 108), the payment network 106 replaces and/or appends the PAN to the authorization request, at 410, and then transmits the modified authorization request to the issuer 108, at 412. In at least one other embodiment, the payment network 106 appends the PAN (in full or in part) to the authorization request, at 410, even when the token is generated by the token provider 116b, whereby the authorization message/request includes the modified authorization message having both the token and the PAN (in full or in part). When the payment network 106 does not append the PAN (or part thereof) to the authorization message, the payment network 106 may request the issuer 108 append the PAN or a part of the PAN (e.g., last four digits), to the authorization responses/replies, whereby the acquirer 104 is able to identify the payment account (at least in part) for purposes of further operations (e.g., security operations, etc.).

In response to the modified authorization request (transmitted at 412), or an unmodified authorization request (i.e., when the token provisioned to the consumer's communication device 114 (and used in the underlying transaction) is generated by the token provider 116b (via the issuer 108)), the issuer 108 processes, at 414, the authorization request and reverts with an authorization response/reply based on one or more evaluations of the requested transaction (e.g., standing of the payment account, funds associated with the payment account, fraud indicators, etc.). In one or more embodiments, the payment network 106 may further cause the issuer 108, for token based transactions, to append a part of the PAN (e.g., last four digits), to the authorization responses, whereby the acquirer 104 is able to identify the payment account (at least in part) for purposes of further operations (e.g., security operations, etc.). In at least one embodiment, the payment network 106 provides the token (e.g., appends the token to the authorization response if not already included therewith, removes the PAN if included in the authorization response, combinations thereof, etc.) and/or full or partial PAN to the acquirer 104, once identified, by the integration engine 124, from the vault data structure 120.

In view of the above, the systems and methods herein may permit use, by payment networks, of tokens even when the tokens are not generated by or in association with the payment networks (e.g., even when the tokens are generated by issuers independent of the payment networks, etc.). As such, the payment networks, even when not involved in generation of the tokens, are able to map the tokens back to corresponding payment accounts (and specifically, PANs), thereby allowing the payment networks to apply value added services to a larger number of underlying transactions processed through the payment networks. In particular, the payment networks are able to apply the value-added services not only to transactions involving internal tokens (as currently available) but also to transactions involving external tokens. And, issuers are permitted to control token generation for their issued consumer payment accounts, while still subscribing to the value added services of the payment network.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a request to provision a token for a payment account to a first party, where the payment account is associated with a payment network; (b) generating the requested token apart from the payment network, whereby the requested token is an external token; (c) transmitting the external token to the first party; (d) transmitting, to the payment network, the external token and a PAN for the payment account associated with the external token thereby permitting the payment network to map the external token to the PAN and provide one or more PAN-dependent services for a transaction, based on an authorization request message including the external token but not the PAN; (e) transmitting, to the payment network, at least one cryptographic key, thereby permitting the payment network to validate a cryptogram included in the authorization request message for the transaction, based on the at least one cryptographic key; (f) intercepting, by the payment network, an authorization request for a transaction involving the payment account; and (g) when the authorization request includes the token, identifying the PAN associated therewith and initiating at least one PAN-related service associated with the token.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) storing, at a payment network, an external token in a vault data structure, the external token associated with a first payment account and generated by a token service provider apart from the payment network; (b) intercepting, by the payment network, an authorization request message for a transaction involving the first payment account; (c) when the authorization request message includes the external token: (1) identifying a primary account number (PAN) for the first payment account based on an association of the external token with the PAN in the vault data structure; and (2) initiating at least one PAN-dependent service associated with the first payment account, such that the at least one PAN-dependent service is available to the transaction based on inclusion of the external token in the vault data structure despite the external token being generated by the token service provider apart from the payment network; (d) generating, by the payment network, an internal token for association with a second payment account in response to a request to provision a token, the second payment account identified by a PAN; (e) storing, at the payment network, the internal token in the vault data structure; (f) appending, by the payment network, at least one indicator to the vault data structure distinguishing the internal token from the external token; (g) when the authorization request message includes the external token, transmitting, by the payment network, the authorization request message to an issuer of the first payment account without appending the PAN for the first payment account to the authorization request message; (i) receiving the external token from the token service provider, the token service provider associated with the issuer of the first payment account; (j) receiving, by the payment network, at least one cryptographic key from the token service provider and/or the issuer of the first payment account; and (k) validating a cryptogram included in the authorization request message based on the at least one cryptographic key prior to transmitting the authentication request message to the issuer of the first payment account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure.

Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for processing transactions to payment accounts based on use of tokens in the transactions, the system comprising:
a payment network coupled between an acquirer and an issuer and including at least one computing device, the at least one computing device including:
a memory having a vault data structure including a mapping between tokens and primary account numbers (PANs) of multiple payment accounts; and
at least one processor coupled to the memory;
wherein the memory includes executable instructions, which when executed by the at least one processor cause the at least one processor to: 'receive a request to provision a token associated with a first one of the multiple payment accounts;
generate an internal token in response to the request to provision the token;
store a first map of the internal token to a first PAN in the mapping in the vault data structure, the first PAN specific to the first one of the multiple payment accounts;
receive a bulk file from a token provider, the bulk file including multiple external tokens and multiple PANs, the multiple external tokens including an external token associated with a second one of the multiple payment accounts and the multiple PANs including a second PAN specific to the second one of the multiple payment accounts, wherein the multiple external tokens are generated by the token provider which is external to and separate from the payment network;
in response to the bulk file, store a second map of the external token to the second PAN in the mapping in the vault data structure;
intercept an authorization request message from the acquirer indicative of a transaction involving one of the multiple payment accounts; and
when the authorization request message includes the external token:
identify the second PAN associated with the external token based on the second map, from the mapping in the vault data structure; and
provide at least one PAN-dependent service for the transaction based on the identified second PAN associated with the external token, whereby the at least one PAN-dependent service is available to the transaction based on inclusion of the external token in the vault data structure despite the external token being generated by the token provider.

2. The system of claim 1, wherein the at least one PAN-dependent service includes a value-added service, the value-added service including one or more of a risk monitoring service, a fraud service, validation of an incoming cryptogram, and an authentication service.

3. The system of claim 1, wherein the executable instructions, when executed by the at least one processor, cause the at least one processor to receive the bulk file from the token provider, via an application programming interface (API) associated with the at least one computing device, the token provider associated with an issuer of the second one of the multiple payment accounts.

4. The system of claim 3, wherein the vault data structure further includes at least one indicator distinguishing the internal token from the external token.

5. The system of claim 1, wherein the request to provision the token includes a request to provision the token to one of a communication device and a merchant.

6. The system of claim 4, wherein the executable instructions, when executed by the at least one processor, further cause the at least one processor to transmit the authorization request message to an issuer of the second one of the multiple payment accounts without appending the second PAN specific to the second one of the multiple payment accounts to the authorization request message, based on the at least one indicator indicating that the authorization request message includes the external token.

7. The system of claim 6, further comprising:
the token provider associated with the issuer of the second one of the multiple payment accounts, the token provider including at least one second computing device comprising executable instructions, which when executed by the at least one second computing device, cause the at least one second computing device to generate the external token associated with the second one of the multiple payment accounts and to transmit the external token, as part of the bulk file, to the payment network.

8. The system of claim 7, wherein the executable instructions of the at least one second computing device, when executed by the at least one second computing device, further cause the at least one second computing device to transmit at least one cryptographic key to the payment network; and
wherein the executable instructions included in the memory of the at least one computing device of the payment network, when executed by the at least one processor of the at least one computing device, cause the at least one processor to validate a cryptogram included in the authorization request message based on the at least one cryptographic key prior to transmitting the authorization request message to the issuer of the second one of the multiple payment accounts.

9. The system of claim 6, wherein the executable instructions, when executed by the at least one processor, further cause the at least one processor to:
when the authorization request message includes the internal token:
identify the first PAN specific to the first one of the multiple payment accounts in the mapping in the vault data structure, based on the internal token;
append the first PAN specific to the first one of the multiple payment accounts to the authorization request message based on the at least one indicator; and transmit the authorization request message to an issuer of the first one of the multiple payment accounts.

10. A computer-implemented method of processing transactions to payment accounts based on use of tokens in the transactions, the method comprising:
receiving, by a payment network, a bulk file from a token provider, the bulk file including multiple external tokens and multiple primary account numbers (PANs), the multiple external tokens including an external token associated with a first payment account and the multiple PANs including a PAN of the first payment account, the multiple external tokens generated by the token provider which is external to and separate from the payment network;

storing, at the payment network, a first map of the external token to the PAN of the first payment account in a vault data structure;

receiving, by the payment network, a request to provision a token associated with a second payment account;

generating, by the payment network, an internal token in response to the request to provision the token associated with the second payment account;

storing, at the payment network, a second map of the internal token to a PAN specific to the second payment account in the vault data structure; and then, intercepting, by the payment network, an authorization request message indicative of a transaction involving the first payment account, the authorization request message including the external token;

identifying, by the payment network, the PAN of the first payment account based on the first map of the external token to the PAN of the first payment account in the vault data structure; and providing at least one PAN-dependent service, based on the identified PAN of the first payment account, whereby the at least one PAN-dependent service is available to the transaction based on inclusion of the external token in the vault data structure despite the external token being generated by the token provider.

11. The computer-implemented method of claim 10, wherein storing the first map of the external token includes appending, by the payment network, at least one indicator to the vault data structure in association with the external token, wherein the at least one indicator distinguishes the internal token from the external token; and wherein the method further comprises transmitting, by the payment network, the authorization request message to an issuer of the first payment account without appending the PAN of the first payment account to the authorization request message based on the at least one indicator.

12. The computer-implemented method of claim 11, further comprising:

receiving, by the payment network, at least one cryptographic key from the token provider and/or the issuer of the first payment account; and validating a cryptogram included in the authorization request message based on the at least one cryptographic key prior to transmitting the authorization request message to the issuer of the first payment account.

13. The system of claim 9, wherein the executable instructions, when executed by the at least one processor, further cause the at least one processor to:

when the authorization request message includes the internal token:

provide at least one PAN-dependent service for the transaction based on the identified first PAN associated with the internal token, whereby the at least one PAN-dependent service is available to the transaction based on inclusion of the internal token in the vault data structure.

14. The computer-implemented method of claim 10, wherein the at least o PAN-dependent service includes one of a fraud service and an authentication service.

* * * * *